United States Patent
Ueno et al.

(10) Patent No.: US 7,540,665 B2
(45) Date of Patent: Jun. 2, 2009

(54) TAPERED ROLLER BEARING

(75) Inventors: Takashi Ueno, Kuwana (JP); Tatsuya Omoto, Kuwana (JP); Takashi Tsujimoto, Iwata (JP)

(73) Assignee: NTN Corporation, Osaka (JP)

( * ) Notice: Subject to any disclaimer, the term of this patent is extended or adjusted under 35 U.S.C. 154(b) by 356 days.

(21) Appl. No.: 11/484,594

(22) Filed: Jul. 12, 2006

(65) Prior Publication Data

US 2007/0014501 A1     Jan. 18, 2007

(30) Foreign Application Priority Data

Jul. 15, 2005   (JP)  ............................. 2005-206692

(51) Int. Cl.
*F16C 33/58*   (2006.01)
*F16C 33/48*   (2006.01)

(52) U.S. Cl. ...................................... 384/571; 384/572

(58) Field of Classification Search ................ 384/450, 384/470–477, 571, 577, 580; 29/898.067, 29/898.07, 898.6
See application file for complete search history.

(56) References Cited

U.S. PATENT DOCUMENTS

| | | | | |
|---|---|---|---|---|
| 2,611,670 A | * | 9/1952 | Gunnar ........................ | 384/577 |
| 3,228,090 A | * | 1/1966 | Schaeffler ............... | 29/898.067 |
| 4,541,743 A | * | 9/1985 | Hatano ........................ | 384/576 |
| 4,664,537 A | * | 5/1987 | Ascheron et al. ............ | 384/470 |
| 5,033,878 A | * | 7/1991 | Tsuji et al. ................... | 384/576 |
| 5,586,826 A | * | 12/1996 | Kellstrom et al. ............ | 384/571 |
| 6,068,406 A | * | 5/2000 | Yoshida et al. ............... | 384/572 |
| 6,513,987 B2 | * | 2/2003 | Takahashi et al. ........... | 384/574 |
| 7,144,162 B2 | * | 12/2006 | Kumar et al. ................ | 384/470 |
| 2002/0181820 A1 | * | 12/2002 | Suzuki et al. ................ | 384/571 |
| 2005/0047699 A1 | * | 3/2005 | Tsujimoto .................... | 384/571 |

FOREIGN PATENT DOCUMENTS

| JP | 9-032858 | | 2/1997 |
|---|---|---|---|
| JP | 11-201149 | | 7/1999 |
| JP | 2002235752 A | * | 8/2002 |
| JP | 2005076675 A | * | 3/2005 |

* cited by examiner

*Primary Examiner*—Marcus Charles
(74) *Attorney, Agent, or Firm*—Wenderoth, Lind & Ponack, L.L.P.

(57) ABSTRACT

A tapered roller bearing includes a retainer formed with a plurality of trapezoidal pockets. Each pocket includes cutouts formed in the crossbars defining each pocket near the narrow end thereof. A tapered roller is received in each pocket with its small-diameter end facing the narrow end of the pocket. Lubricating oil flowing into the bearing space defined radially inwardly of the retainer can quickly flows through the cutouts into the bearing space defined radially outwardly of the retainer at the narrow end of each pocket. Thus, it is possible to reduce the amount of lubricating oil flowing along the raceway of the inner ring to the large-diameter flange, and thus reduce the amount of lubricating oil remaining in the bearing, thereby reducing the torque loss due to rotational resistance of the bearing resulting from lubricating oil remaining in the bearing.

8 Claims, 5 Drawing Sheets

Fig. 5
Fig. 6
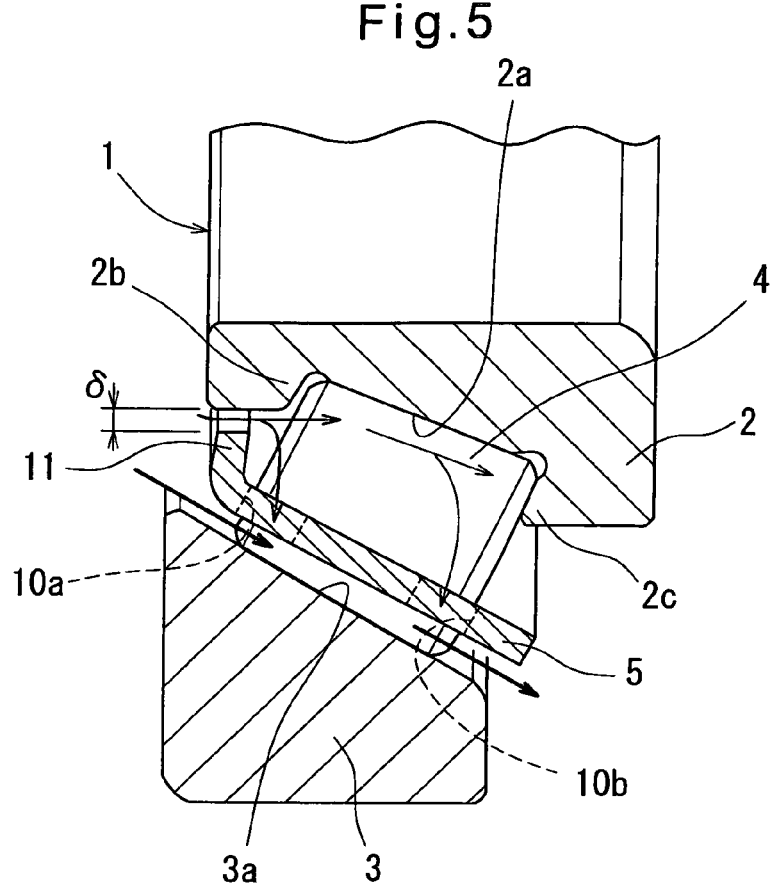
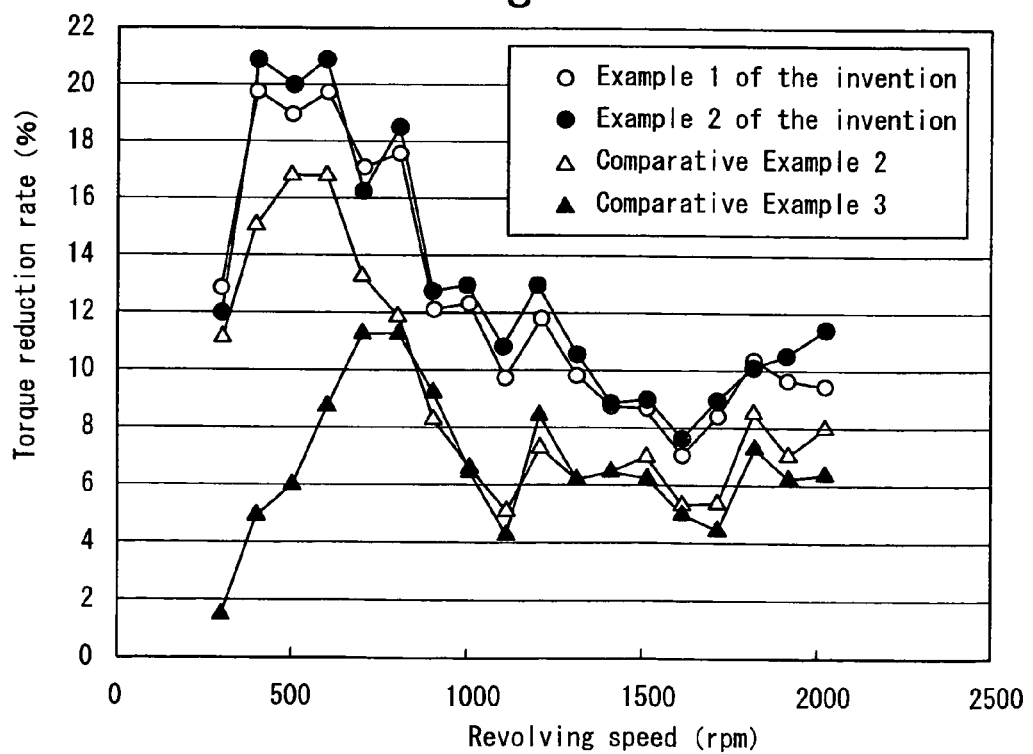

ent invention relates to a tapered roller bearing
TAPERED ROLLER BEARING

BACKGROUND OF THE INVENTION

The present invention relates to a tapered roller bearing suitable for use in environments where lubricating oil flows into the bearing.

A tapered roller bearing comprises an inner ring formed with a radially outwardly facing raceway and including small-diameter flange and a large-diameter flange at the axial ends of the raceway, an outer ring formed with a radially inwardly facing raceway, a plurality of tapered rollers disposed between the raceways of the inner and outer rings, and a retainer retaining the tapered rollers. The retainer comprises a small-diameter annular portion, a large-diameter annular portion and a plurality of crossbars through which the small-diameter and large-diameter annular portions are coupled together. The adjacent crossbars define trapezoidal pockets having narrow and wide ends facing the small-diameter and large-diameter annular portions, respectively. Each tapered roller is received in one of the pockets with its small-diameter end facing the small-diameter annular portion and its large-diameter end facing the large-diameter annular portion.

When such tapered roller bearings are used to support power transmission shafts of differentials or transmissions in automotive vehicles, they are used with their lower portions dipped in an oil bath. When such tapered rollers rotate, oil forming the oil bath flows into the bearings as lubricating oil. Lubricating oil that has flown into a tapered roller bearing from its small-diameter end partially flows through a bearing space defined radially outwardly of the retainer along the raceway of the outer ring toward the large-diameter ends of the tapered rollers, and partially flows through a bearing space defined radially inwardly of the retainer along the raceway of the inner ring toward the large-diameter ends of the tapered rollers.

Among tapered roller bearings used in environments where lubricating oil flows thereinto, there are known ones in which cutouts are formed in each pocket of the retainer (see JP patent publications 9-32858A (FIG. 3) and 11-201149A (FIG. 2)). With this arrangement, lubricating oil flowing through the spaces radially inwardly and outwardly of the retainer passes through the cutouts, so that lubricating oil can smoothly flow through the bearing. In the arrangement of the former publication, as shown in FIG. 7A, each pocket 9 has a pair of cutouts 10d formed in the crossbars 8 defining each pocket 9 at their intermediate portions. In the arrangement of the latter publication, as shown in FIG. 7B, each pocket 9 has a pair of cutouts 10e formed in the small-diameter annular portion 6 and the large-diameter annular portion 7 so that lubricating oil flowing through the bearing space defined radially outwardly of the retainer 5 can smoothly flow into the bearing space defined radially inwardly of the retainer 5. The retainers of Comparative Examples subjected to the below-described torque measurement test have the same dimensions as the dimensions of the retainers shown in FIGS. 7A and 7B.

It has been discovered that the higher the rate of the amount of lubricating oil flowing through the bearing space defined radially inwardly of the retainer with respect to the amount of lubricating oil flowing through the bearing space defined radially outwardly of the retainer, the greater the torque loss. This is presumably for the following reasons.

Since there exists no obstacle on the radially inner surface of the outer ring, lubricating oil flowing into the bearing space defined radially outwardly of the retainer smoothly flows therethrough along the raceway of the outer ring toward the large-diameter ends of the tapered rollers and leaves the bearing. On the other hand, the flow of lubricating oil through the bearing space defined radially inwardly of the retainer tends to be stopped or slowed down by the large-diameter flange formed on the radially outer surface of the inner ring at the large-diameter ends of the tapered rollers. Lubricating oil thus tends to remain in the bearing space defined radially inwardly of the retainer. Thus, the greater the amount of lubricating oil flowing into the bearing space defined radially inwardly of the retainer, the greater the amount of lubricating oil remaining in the bearing. Lubricating oil remaining in the bearing increases the rotational resistance of the bearing and thus the torque loss.

An object of the present invention is to reduce the torque loss in a tapered roller bearing by reducing the rotational resistance resulting from lubricating oil flowing into the bearing.

SUMMARY OF THE INVENTION

According to the present invention, there is provided a tapered roller bearing comprising an inner ring formed with a radially outwardly facing raceway and including a small-diameter flange and a large-diameter flange provided at both ends of the radially outwardly facing raceway, respectively, an outer ring formed with a radially inwardly facing raceway, a plurality of tapered rollers disposed between the radially inwardly facing raceway and the radially outwardly facing raceway and each having a small-diameter end surface and a large-diameter end surface, and a retainer comprising a small-diameter annular portion, a large-diameter annular portion and a plurality of crossbars through which the small-diameter annular portion and the large-diameter annular portion are coupled together, the crossbars defining trapezoidal pockets therebetween each having a narrow end facing the small-diameter annular portion and a wide end facing the large-diameter annular portion, the tapered rollers being each received in one of the pockets with the small-diameter end surface thereof facing the small-diameter annular portion and the large-diameter end surface thereof facing the large-diameter annular portion, each of the pockets including cutouts each formed in one of the adjacent crossbars near the narrow end thereof.

By providing each of the trapezoidal pockets with cutouts formed in the crossbars defining each pocket near the narrow end thereof, lubricating oil flowing into the bearing space defined radially inwardly of the retainer smoothly and quickly flows into the bearing space defined radially outwardly of the retainer near the narrow ends of the pockets. Thus, it is possible to reduce the amount of lubricating oil flowing along the raceway of the inner ring to the large-diameter flange, and thus reduce the amount of lubricating oil remaining in the bearing, thereby reducing the torque loss due to rotational resistance of the bearing resulting from lubricating oil remaining in the bearing.

By providing each trapezoidal pocket with an additional cutout formed in the small-diameter annular portion, lubricating oil flowing into the bearing space defined radially inwardly of the retainer partially flows through this additional cutout into the bearing space defined radially outwardly of the retainer. Thus, it is possible to further reduce the amount of lubricating oil flowing along the raceway of the inner ring to the large-diameter flange, thereby further reducing the torque loss due to rotational resistance of the bearing resulting from lubricating oil remaining in the bearing.

By providing each trapezoidal pocket with further additional cutouts at least in the crossbars defining each pocket near the wide end thereof, the tapered rollers can be brought into sliding contact with the crossbars with good balance.

In this case, the total area of the cutouts formed near the narrow end of each of the pockets is preferably greater than the total area of the cutouts formed near the wide end thereof to reduce the amount of lubricating oil flowing along the raceway of the inner ring to the large-diameter flange, thereby reducing the torque loss due to rotational resistance of the bearing resulting from lubricating oil remaining in the bearing.

Preferably, the small-diameter annular portion has at an axially outer portion thereof a radially inwardly extending flange to define a gap between a radially inner surface of the radially inwardly extending flange and a radially outer surface of the small-diameter flange of the inner ring, the gap having a radial dimension that is not more than 2.0% of the outer diameter of the small-diameter flange of the inner ring. With this arrangement, it is possible to reduce the amount of lubricating oil flowing along the raceway of the inner ring to the large-diameter flange, thereby reducing the torque loss due to rotational resistance of the bearing resulting from lubricating oil remaining in the bearing.

Preferably, at least a surface of each of the tapered rollers is formed with a multitude of minute recesses arranged at random such that the surface of each of the tapered rollers has a surface roughness parameter Ryni that satisfies the relation of $0.4\ \mu m \leqq Ryni \leqq 1.0\ \mu m$ and an Sk value of not more than $-1.6$. With this arrangement, it is possible to retain lubricating oil uniformly over the surface of each tapered roller. This in turn makes it possible to sufficiently lubricate the contact surfaces of the tapered rollers and the inner and outer rings, even if lubricating oil remaining in the bearing is reduced.

The parameter Ryni is the average of maximum heights of predetermined lengths, i.e. the distance between a peak and a trough of a portion of the roughness curve picked out in the direction of the average line, as measured in the direction of the depth magnification of the roughness curve (ISO 4287: 1997). The Sk value indicates the degree of distortion of the roughness curve, i.e. the degree of asymmetry of the distribution of protrusions and recesses forming the roughness curve. If the distribution is symmetrical as with the Gaussian distribution, the Sk value will be close to zero. If protrusions of the roughness curve are removed, the Sk value will be negative, and if recesses are removed, the Sk value will be positive. The Sk value is adjustable by selecting the rotational speed of a barrel finishing machine, machining time, amount of workpieces supplied, and the kind and size of the finishing tool. By adjusting the Sk value to not more than $-1.6$, lubricating oil can be uniformly retained in numerous minute recesses formed in the tapered rollers.

The above-described tapered roller bearings are most suitably used to support power transmission shafts of automotive vehicles.

BRIEF DESCRIPTION OF THE DRAWINGS

Other features and objects of the present invention will become apparent from the following description made with reference to the accompanying drawings, in which:

FIG. 5 is a sectional view of one of the tapered roller bearings of FIG. 4, showing how lubricating oil flows into the bearing;

FIG. 6 is a graph showing the results of a torque measurement test; and

DETAILED DESCRIPTION OF THE PREFERRED EMBODIMENTS

Figure 1:
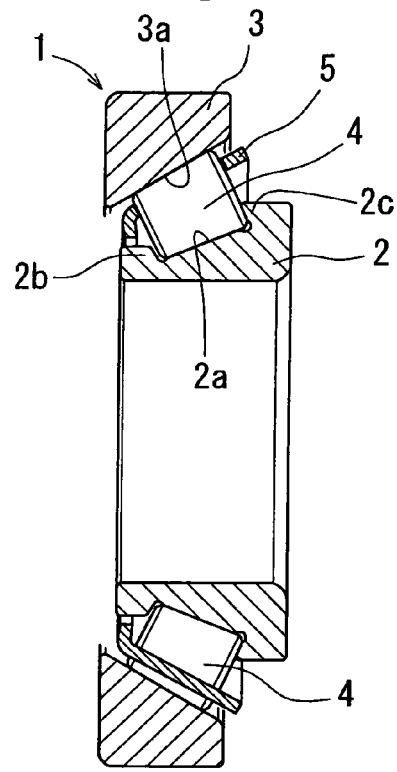
FIG. 1 is a vertical sectional view of a tapered roller bearing embodying the present invention.

Now the embodiment of the present invention is described with reference to the drawings. As shown in FIG. 1, the tapered roller bearing embodying the invention comprises an inner ring 2 formed with a raceway 2a, an outer ring 3 formed with a raceway 3a, and a plurality of tapered rollers 4 disposed between the raceways 2a and 3a and retained by a retainer 5. The inner ring 2 has a small-diameter flange 2b and a large-diameter flange 2c at the respective axial ends of the raceway 2a to restrict the axial movement of the tapered rollers 4.

Figure 2:
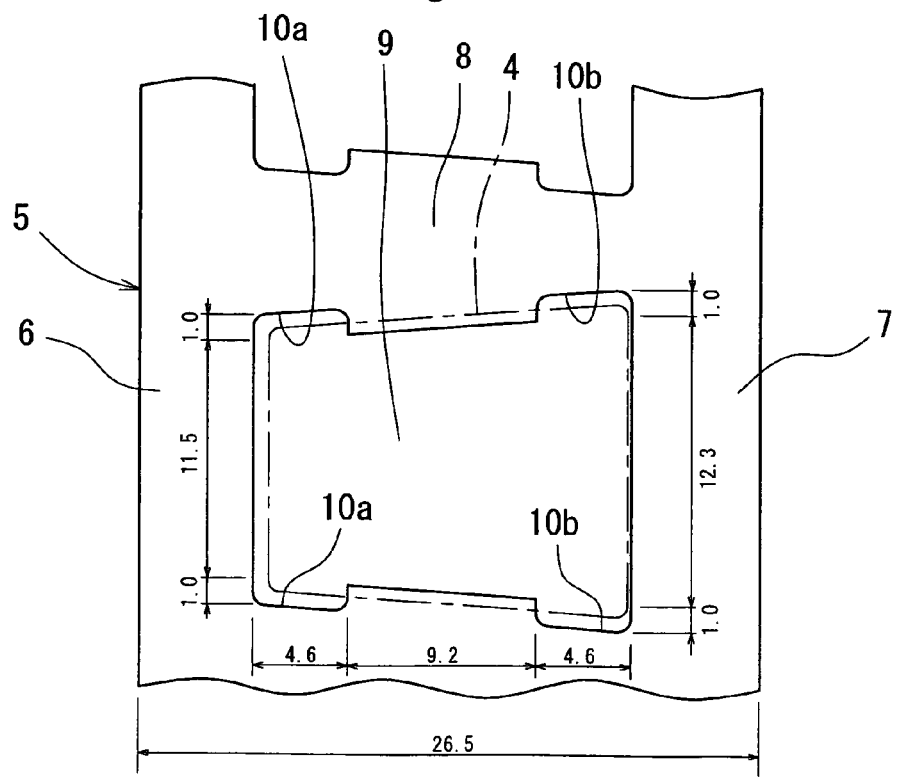
FIG. 2 is a developed plan view of a retainer of FIG. 1.

As shown in FIG. 2, the retainer 5 comprises a small-diameter annular portion 6 disposed to face the small-diameter end surfaces of the tapered rollers 4, a large-diameter annular portion 7 disposed to face the large-diameter end surfaces of the tapered rollers 4, and a plurality of crossbars 8 through which the small-diameter and large-diameter annular portions 6 and 7 are connected together. The crossbars 8 define a plurality of trapezoidal pockets 9 arranged such that their narrow ends face the small-diameter annular portion 6 and their wide ends face the large-diameter annular portion 7. The tapered rollers 4 are each received in one of the pockets 9 with its small-diameter end received in the narrow end portion of the pocket 9 and its large-diameter end received in the wide end portion of the pocket 9. At the narrow end of each pocket 9, two cutouts 10a are formed each in one of the adjacent crossbars 8. At the wide end of each pocket 9, two cutouts 10b are formed each in one of the adjacent crossbars 8. Each of the cutouts 10a and 10b is 1.0 mm deep and 4.6 mm wide.

Figure 3A:
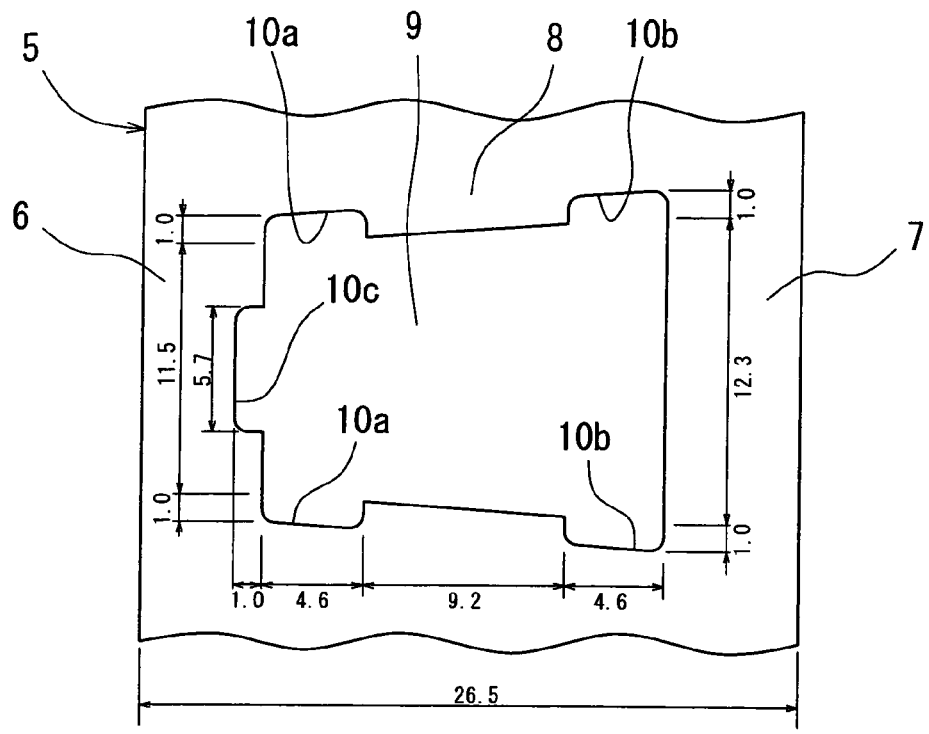
FIGS. 3A and 3B are developed plan views of modified retainers, respectively.
Figure 3B:
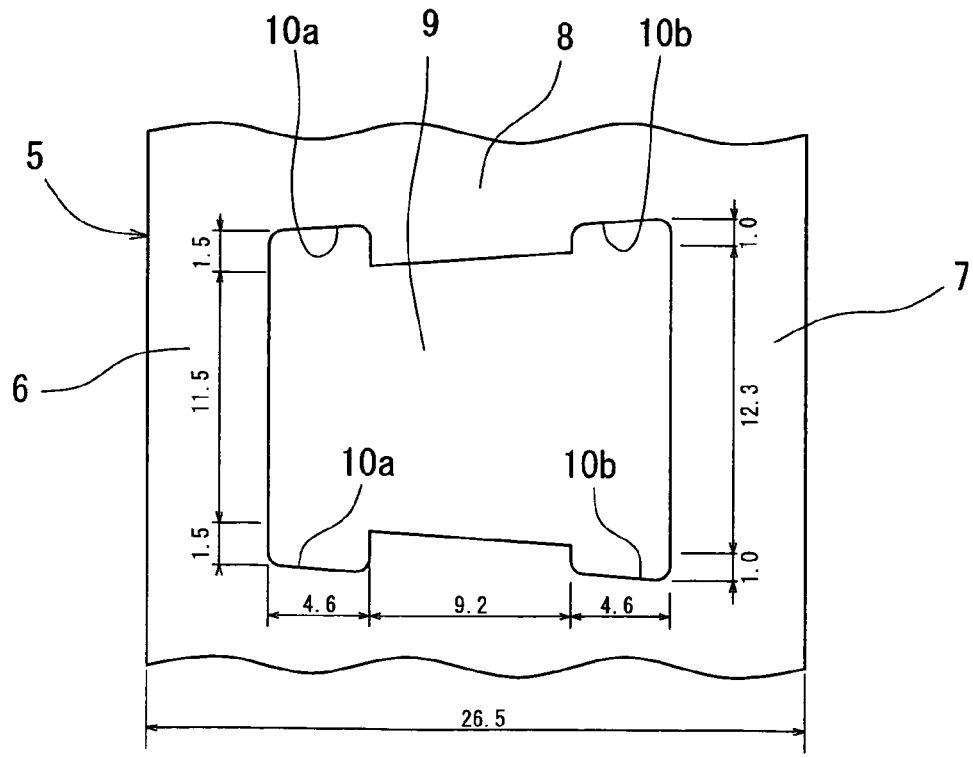

FIGS. 3A and 3B show different retainers 5. Each pocket 9 of the retainer 5 of FIG. 3A includes, in addition to the cutouts 10a and 10b, an additional cutout 10c formed in the small-diameter annular portion 6 so that the three cutouts 10a and 10c, which are provided at the narrow end of each pocket, has a total area larger than the total area of the two cutouts 10b, which are provided at the wide end of the pocket. The cutout 10c is 1.0 mm deep and 5.7 mm wide.

The retainer 5 of FIG. 3B differs from the retainer 5 of FIG. 2 in that the cutouts 10a at the narrow end of each pocket are 1.5 mm deep and thus are deeper than the cutouts 10b at the wide end of each pocket. Thus, the total area of the cutouts 10a is greater than the total area of the cutouts 10b.

As shown in FIG. 5, on the axially outer edge of the small-diameter annular portion 6, a radially inwardly extending flange 11 is provided to face the radially outer surface of the small-diameter flange 2b of the inner ring 2 with a gap δ defined between the radially inner surface of the flange 11 and the radially outer surface of the small-diameter flange 2b of the inner ring 2. The gap δ is not more than 2.0% of the outer diameter of the small-diameter flange 2b.

While not shown, over the entire surfaces of the tapered rollers 4, numerous minute recesses are randomly formed so that the surfaces of the tapered rollers in which such recesses are formed have a surface roughness parameter Ryni that satisfies the relation $0.4\ \mu m \leqq Ryni \leqq 1.0\ \mu m$, and have an Sk value of not more than $-1.6$.

Figure 4:
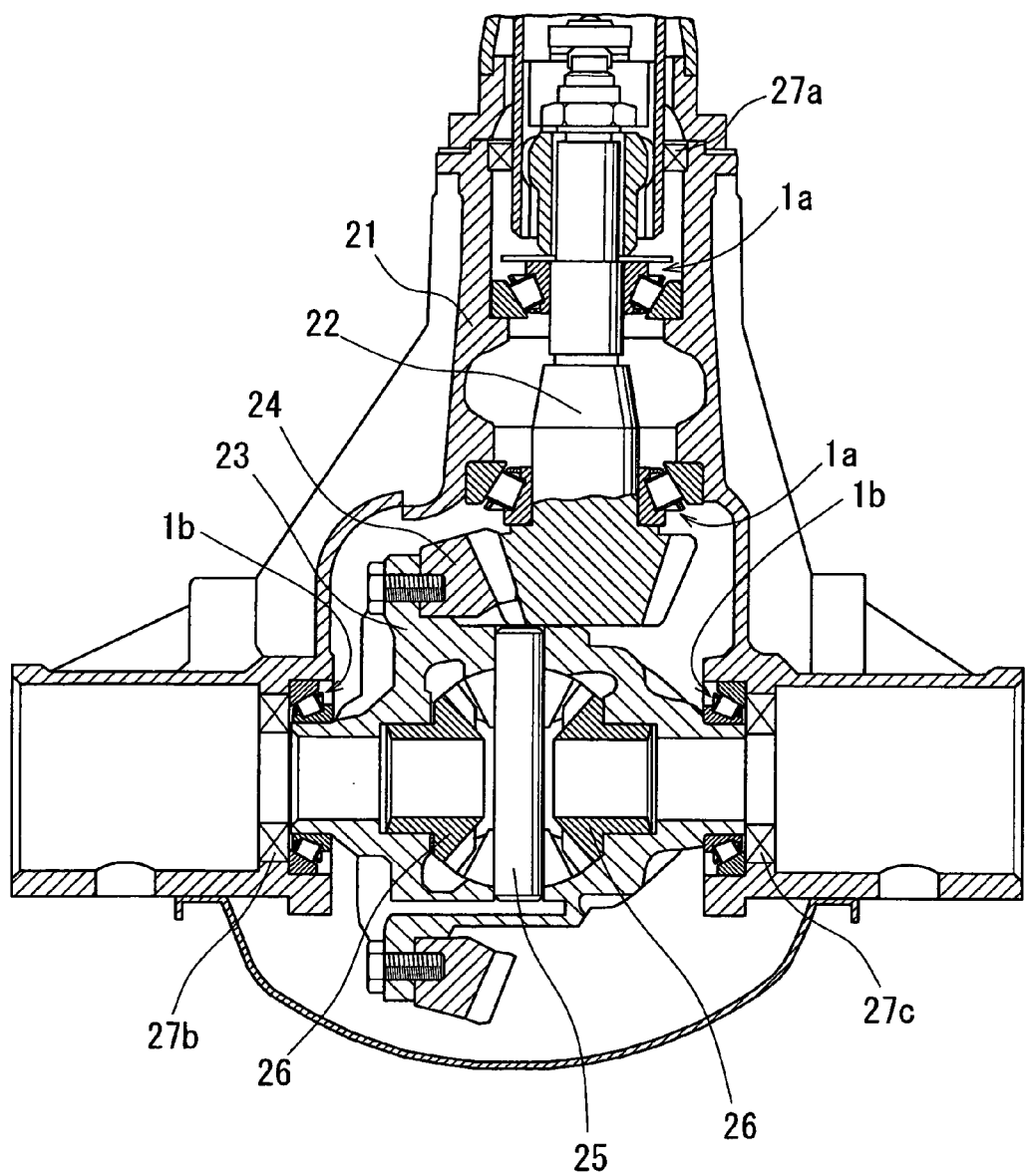
FIG. 4 is a cross-sectional view of a differential in which are used tapered roller bearings as shown in FIG. 1.

FIG. 4 shows a vehicle differential in which tapered roller bearings 1 as described above are used. This differential includes a drive pinion 22 coupled to a propeller shaft (not shown) and inserted in a differential case 21, a ring gear 24 mounted on a differential gear case 23 and meshing with the drive pinion 22, pinion gears 25 mounted in the differential gear case 23, and side gears 26 coupled to drive shafts (not shown) inserted in the differential gear case 23 from both sides and meshing with the pinion gears 25. Driving force produced by the vehicle engine is thus transmitted to the right and left drive shafts through the propeller shaft. The drive pinion 22, as a power transmission member, and a differential gear case 23 are supported on the differential case 21 through two pairs of tapered roller bearings 1a and 1b, respectively.

The differential case 21 contains lubricating oil and is sealed by seal members 27a, 27b and 27c. The tapered roller bearings 1a and 1b rotate with their lower portions dipped in an oil bath of the oil in the differential case 21.

When the tapered roller bearings 1a and 1b rotate at a high speed with their lower portions dipped in the oil bath, lubricating oil of the oil bath flowing into each bearing from its small-diameter end flows partially into the bearing space defined radially outwardly of the retainer 5 and partially into the bearing space disposed radially inwardly of the retainer 5. Lubricating oil that has flown into the bearing space defined radially outwardly of the retainer 5 flows along the raceway 3a of the outer ring 3 to the large-diameter ends of the tapered rollers 4 and leaves the bearing. Compared to the amount of lubricating oil flowing into the bearing space defined radially outwardly of the retainer 5, the amount of lubricating oil flowing into the bearing space disposed radially inwardly of the retainer 5 is extremely small because the gap δ between the flange 11 formed on the small-diameter annular portion 6 of the retainer 5 and the small-diameter flange 2b of the inner ring 2 is narrow. Also, most of any lubricating oil that has flown into the bearing space defined radially inwardly of the retainer 5 through the gap δ flows through the cutouts 10a, which are formed in the adjacent crossbars 8 at the narrow end of each pocket, into the bearing space defined radially outwardly of the retainer. Thus, only a very small amount of lubricating oil flows along the raceway 2a of the inner ring 2 to the large-diameter flange 2c. Thus, it is possible to reduce the amount of lubricating oil that remains in the bearings.

EXAMPLES

Figure 7A:
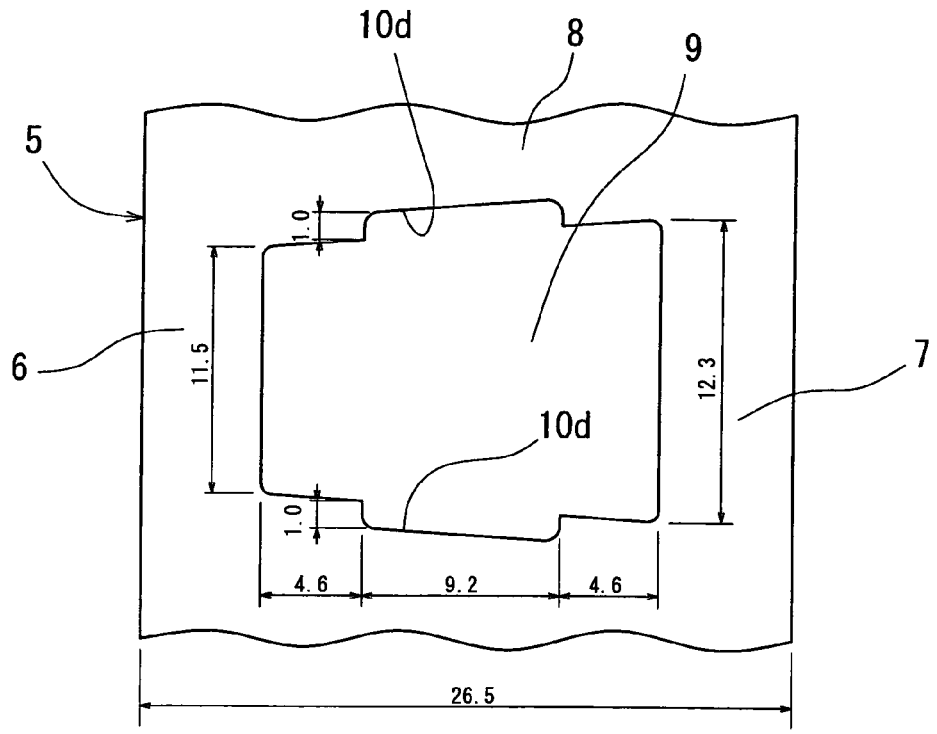
FIGS. 7A and 7B are developed plan views of conventional retainers.
Figure 7B:
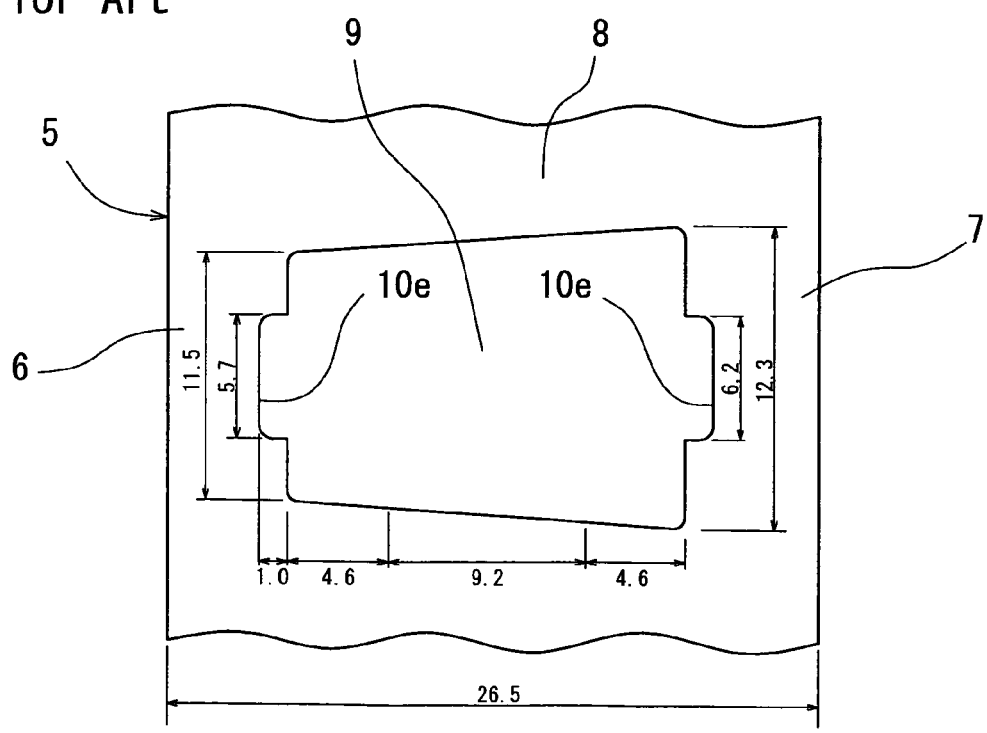

As examples of the invention, a tapered roller bearing including the retainer shown in FIG. 2 (Example 1 of the invention), and a tapered roller bearing including the retainer shown in FIG. 3A (Example 2 of the invention) were prepared. As Comparative Examples, a tapered roller bearing including a retainer having no cutouts in the pockets (Comparative Example 1) and tapered roller bearings including retainers shown in FIGS. 7A and 7B (Comparative Examples 2 and 3), respectively, were prepared. The respective tapered roller bearings measured 100 mm in outer diameter, 45 mm in inner diameter and 27.25 mm in width, and were identical to each other except for cutouts of their retainers.

Tapered roller bearings of Examples of the invention and Comparative Examples were subjected to a torque measurement test under the following conditions:
Axial load: 300 kgf
Revolving speed: 300 to 2000 rpm (100 rpm pitch)
Lubricating conditions: oil bath lubrication (lubricating oil: 75W-90)

FIG. 6 shows the results of the torque measurement test. The vertical axis of the graph in FIG. 6 indicates the reduction rate of torque compared to the torque of Comparative Example 1, which includes a retainer having no cutouts in the pockets. For Comparative Example 2, in which cutouts are formed in the adjacent crossbars in the middle of each pocket, and Comparative Example 3, in which cutouts are formed in the small-diameter annular portion and large-diameter annular portion, torque decreased to some extent. But for Example 1 of the invention, in which cutouts are formed in the adjacent crossbars at the narrow end of each pocket, the torque reduction rate was higher than Comparative Examples 2 and 3, and for Example 2 of the invention, in which the total area of the cutouts formed at the narrow end of each pocket is greater than the total area of the cutouts formed at the wide end, the torque reduction rate was the highest.

For Examples 1 and 2 of the invention, the torque reduction rates were 9.5% and 11.5%, respectively, at 2000 rpm, which was the maximum revolving speed in the test. Thus, it is apparent that Examples of the invention achieve excellent torque reduction rates when used at high revolving speeds in differentials and transmissions. The torque reduction rates in Comparative Examples 2 and 3 at 2000 rpm were 8.0% and 6.5%, respectively.

What is claimed is:

1. A tapered roller bearing comprising:
    an inner ring formed with a radially outwardly facing raceway and including a small-diameter flange and a large-diameter flange provided at two ends of said radially outwardly facing raceway, respectively;
    an outer ring formed with a radially inwardly facing raceway;
    a plurality of tapered rollers disposed between said radially inwardly facing raceway and said radially outwardly facing raceway and each having a small-diameter end surface and a large-diameter end surface; and
    a retainer comprising a small-diameter annular portion, a large-diameter annular portion and a plurality of crossbars through which said small-diameter annular portion and said large-diameter annular portion are coupled together, said crossbars defining trapezoidal pockets therebetween each having a narrow end facing said small-diameter annular portion and a wide end facing said large-diameter annular portion;
    wherein each of said tapered rollers is received in one of said pockets with said small-diameter end surface thereof facing said small-diameter annular portion and said large-diameter end surface thereof facing said large-diameter annular portion;
    wherein each of said pockets includes first cutouts each formed in one of the adjacent crossbars near said narrow end thereof, and second cutouts each formed in one of the adjacent crossbars near said wide end thereof; and
    wherein, for each of said pockets, a total area of said first cutouts is greater than a total area of said second cutouts.

2. The tapered roller bearing of claim 1 wherein said small-diameter annular portion has at an axially outer portion thereof a radially inwardly extending flange to define a gap between a radially inner surface of said radially inwardly extending flange and a radially outer surface of said small-diameter flange of said inner ring, said gap having a radial dimension that is not more than 2.0% of the outer diameter of said small-diameter flange of said inner ring.

3. The tapered roller bearing of claim 1 wherein at least a surface of each of said tapered rollers is formed with a multitude of minute recesses arranged at random such that said surface of each of said tapered rollers has a surface roughness parameter Ryni that satisfies a relation of $0.4\ \mu m \leq Ryni \leq 1.0\ \mu m$ and an Sk value of not more than $-1.6$.

4. The tapered roller bearing of claim 1 which supports a power transmission shaft of an automotive vehicle.

5. A tapered roller bearing comprising:

an inner ring formed with a radially outwardly facing raceway and including a small-diameter flange and a large-diameter flange provided at two ends of said radially outwardly facing raceway, respectively;

an outer ring formed with a radially inwardly facing raceway;

a plurality of tapered rollers disposed between said radially inwardly facing raceway and said radially outwardly facing raceway and each having a small-diameter end surface and a large-diameter end surface; and a retainer comprising a small-diameter annular portion, a large-diameter annular portion and a plurality of crossbars through which said small-diameter annular portion and said large-diameter annular portion are coupled together, said crossbars defining trapezoidal pockets therebetween each having a narrow end facing said small-diameter annular portion and a wide end facing said large-diameter annular portion;

wherein each of said tapered rollers is received in one of said pockets with said small-diameter end surface thereof facing said small-diameter annular portion and said large-diameter end surface thereof facing said large-diameter annular portion;

wherein each of said pockets includes first cutouts each formed in one of the adjacent crossbars near said narrow end thereof, second cutouts each formed in one of the adjacent crossbars near said wide end thereof, and a third cutout formed in said small-diameter annular portion; and wherein, for each of said pockets, a total area of said first cutouts and said third cutout is greater than a total area of said second cutouts.

6. The tapered roller bearing of claim 5 wherein said small-diameter annular portion has at an axially outer portion thereof a radially inwardly extending flange to define a gap between a radially inner surface of said radially inwardly extending flange and a radially outer surface of said small-diameter flange of said inner ring, said gap having a radial dimension that is not more than 2.0% of the outer diameter of said small-diameter flange of said inner ring.

7. The tapered roller bearing of claim 5 wherein at least a surface of each of said tapered rollers is formed with a multitude of minute recesses arranged at random such that said surface of each of said tapered rollers has a surface roughness parameter Ryni that satisfies a relation of $0.4\ \mu m \leqq Ryni \leqq 1.0\ \mu m$ and an Sk value of not more than $-1.6$.

8. The tapered roller bearing of claim 5 which supports a power transmission shaft of an automotive vehicle.

* * * * *